United States Patent [19]
Nicholls

[11] Patent Number: 4,735,479
[45] Date of Patent: Apr. 5, 1988

[54] OPTICAL FIBER TERMINATION

[75] Inventor: Simon T. Nicholls, Woodbridge, England

[73] Assignee: British Telecommunications plc, England

[21] Appl. No.: 854,483

[22] Filed: Apr. 22, 1986

[30] Foreign Application Priority Data

Apr. 23, 1985 [GB] United Kingdom ............... 8510263

[51] Int. Cl.⁴ .............................................. G02B 6/36
[52] U.S. Cl. ................................ 350/96.20; 350/96.21
[58] Field of Search ............ 350/96.20, 96.21, 96.22, 350/96.23

[56] References Cited

U.S. PATENT DOCUMENTS

| 3,586,563 | 6/1971 | Fukkami et al. | 156/174 |
| 3,920,432 | 11/1975 | Smith | 350/96.20 |
| 4,208,094 | 6/1980 | Tomlinson, III et al. | 350/96.20 |
| 4,629,284 | 12/1986 | Malavieille | 350/96.21 |

FOREIGN PATENT DOCUMENTS 0205106 11/1983 Japan .
1524874 9/1978 United Kingdom .

OTHER PUBLICATIONS

Applied Optics, vol. 17, No. 22, 15th 1978, pp. 3675–3678; H. Yamamoto et al: "Moving Optical Fiber Switch Experimen".

Primary Examiner—William L. Sikes
Assistant Examiner—Akm E. Ullah
Attorney, Agent, or Firm—Nixon & Vanderhyde

[57] ABSTRACT

An optical fiber terminating device and a method of terminating optical fibers are shown. Fibres are secured in a receptacle which is formed by two parts joined together to form a precise "V" shaped groove having an internal angle of sixty degrees. The groove is arranged to receive a close packed array of small diameter juxtaposed fibers which are permanently fixed within the groove.

17 Claims, 2 Drawing Sheets

OPTICAL FIBER TERMINATION

BACKGROUND OF THE INVENTION

The present invention relates to an optical fiber terminating device and a method of terminating optical fibers in which the ends of a plurality of fibers are permanently secured in a receptacle.

The advantages of optical fibers, over copper conductors, for signal transmission are well known and include, for example, broad bandwidth and immunity to inductive pick up. However a particular problem with optical fibers is that of termination to facilitate splicing and switching etc. Unfortunately developments which have improved transmission qualities have resulted in fibers having a small outer diameter with an even smaller transmission core. Terminating monomode fibers having a small outer diameter (in the range of two hundred micron down to ten micron) is therefore particularly difficult.

Optical fibers are preferably terminated in groups or bundles rather than individually. This not only facilitates mechanical handling of the fibers but also allows additional functions to be provided, for example signal switching and multiplexing. A method of terminating small diameter fibers is shown in British Pat. No. 1524874 of Chinnock. FIG. 1 of this patent shows a receptacle in the form of a holder 10 in two Sections 11 and 12. Each section has a series of parallel grooves having an internal angle of ninety degrees. A fiber is placed in each of the grooves of Section 11 and then covered by a co-operating groove in Section 12. The fibers are then permanently secured by an expoxy adhesive.

In the above known terminating device the relative position of the fibers can be maintained within a very accurate tolerance range. However a disadvantage of the device is that it only provides a linear band of fibers and not a multi layer array, the latter being desirable in many applications. A multi layer array could be fabricated by securing a plurality of holders together or alternatively, intermediate holder sections may be provided with grooves on both sides. However both of these techniques result in an array in which the distance between fibers is relatively very large.

Closely packed arrays may be produced for large diameter multimode fibers by known techniques. An example of grouping large diameter fibers is shown by Tomlinson in U.S. Pat. No, 4,208,094. However it must be realised that handling large diameter fibers is relatively easy and represents a totally different branch of the optical fiber art. It is therefore possible to glue seven large diameter fibers together to produce an array consisting solely of fibers and glue. This approach would not be suitable for small diameter fibers which are very delicate. Before being glued, the seven fibers of Tomlinson are supported in a "V" shaped groove with three dummy fibers. The groove is formed in a support block and techniques are known for providing a groove which is accurate enough for large diameter fibers. However such a groove could not be machined to the required tolerances for small diameter fibers.

SUMMARY OF THE INVENTION

According to a first aspect of the invention there is provided an optical fiber terminating device in which the ends of a plurality of small diameter fibers are permanently secured in a receptacle. The receptacle comprises two parts joined together to form a precise "V" shaped groove having an internal angle of sixty degrees and the "V" shaped groove is arranged to receive a close packed array of small diameter juxtaposed fibers which are permanently fixed within the groove.

Preferably the two parts have two inclined surfaces and are joined such that all of said surfaces meet along a common line.

Preferably the device includes a wedge for contacting the row of fibers furthermost from the common line. Preferably the receptacle is fabricated in silica facilitating bonding between the receptacle and the fibers.

In a preferred embodiment the fibers form an array having a triangular cross section, the axis of a central fiber lies on the cross section of the three lines bisecting the angles of the triangular array, and the receptacle is arranged to rotate about the axis of the central fiber. It should be noted that six fibers surround the inner most fiber wherein an array fabricated according to the Chinnock teaching would only provide four fibers surrounding an inner most fiber.

In a preferred embodiment the receptacle is substantially cylindrical and the central fiber is positioned along the central axis of the cylindrical receptacle.

A small fiber may be defined as having a diameter in the range of ten micron to two hundred micron, however, preferably the "V" shaped groove is arranged to receive fibers having an outer diameter in the range of forty micron to one hundred and seventy micron. The device is therefore advantageously arranged to accommodate monomode fibers.

According to a second aspect of the present invention there is provided a method of terminating a plurality of optical fibers in which the fibers are permanently secured in a receptacle. The method comprises the steps of joining two parts of the receptacle so that four surfaces meet along a common base line forming a precise sixty degree groove, bending small diameter fibers and introducing them to the receptacle with a force acting generally towards the base line of the groove, and permanently securing an array of juxtaposed fibers in the receptacle.

The method may also include the steps of bending a first fiber and applying force in the direction of the base line of the groove so that the fiber lies along the groove, bending two further fibers and applying force in the direction of the groove so that the further fibers are juxtaposed with the first, and introducing further fibers in the same manner to form an optical fiber array having a triangular cross-section.

An alternative preferred method comprises the steps of grouping the fibers in a "V" shaped guide to form a triangular array, inclining the guide at an angle to the receptacle so as to bend the fibers and forcing the fibers in juxtaposition into the receptacle.

DESCRIPTION OF THE PREFERRED EMBODIMENT

Figure 1:
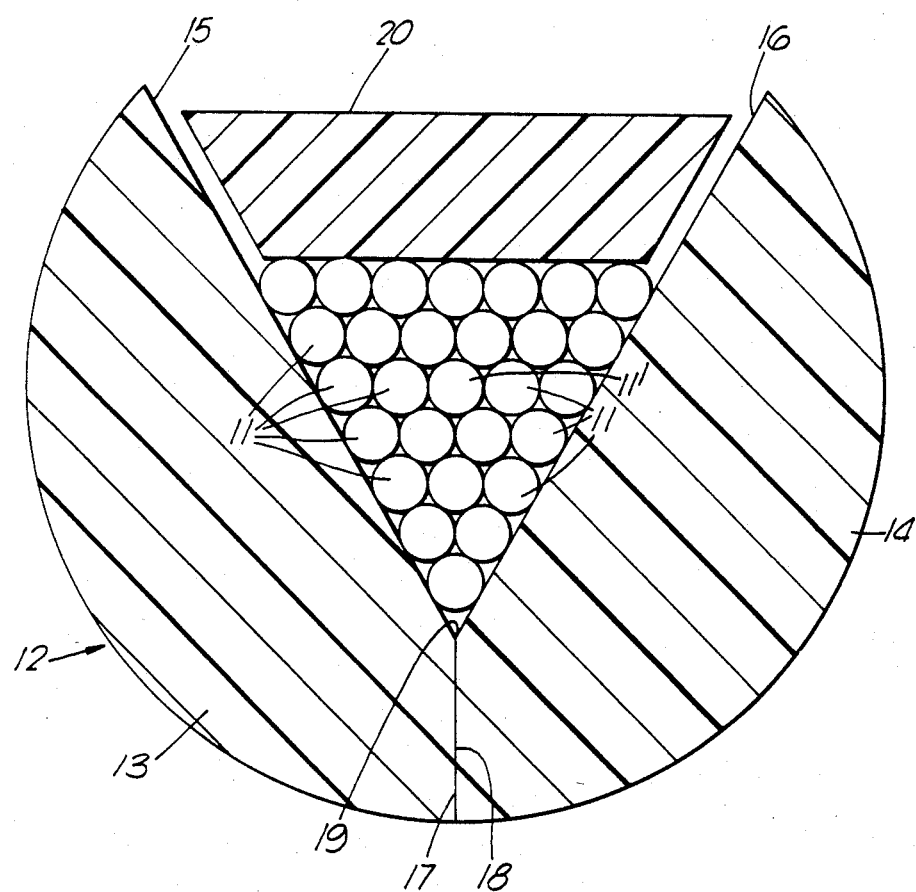
FIG. 1 is a sectional side view of an optical fiber terminating device according to an embodiment of this invention.

Referring to FIG. 1, this shows a multi-layer optical fiber termination, viewed in section taken normal to the axes of optical fibers 11. There are seven layers of fibers 11 in a triangular array.

The fibers are held in a receptacle 12, the body of which is formed in two parts, 13 and 14, of fused silica. The parts 13 and 14 are alike; each has a pair of inclined plane surfaces 15, 16, and the parts are joined by fusing surfaces 17, 18 together, so that the four surfaces 15, 16, 17, 18 meet along an edge indicated by 19 in the Figure. This line is the base line of the "V" groove formed by surfaces 15, 16 which are inclined at sixty degrees to one another. By forming the body in two parts the two sides 15, 16 can be made to meet very precisely at edge 19 so that the base of the "V" groove is a sharp sixty degree angle. This ensures that the lowermost fiber fits into the bottom of the groove as shown and all the fibers of the array can be juxtaposed. A rounded base to the groove can lead to the bottom fiber being incorrectly positioned, and there will then be a gap between the two fibers in the second row, and gaps between other fibers in the array.

The fibers are held together by adhesive and a silica wedge 20 is disposed on the top row of fibers 11.

The receptacle 12 may be held in a standard connector normally used for one fiber, or for a single row of fibers. One fiber, preferably the central fiber 11', is aligned in the connector in a standard manner. Depending on the application, for example for circular switching, the connector may be rotated about the axis of this fiber.

The fibers 11 are monomode fibers having an outer diameter of one hundred and twenty-five micron when stripped of their protective coating. Larger or smaller diameter fibers may be used if desired, for example, fibers having a diameter of fifty micron could be located in the receptacle 12. The fibers used would normally have diameters of less than two hundred micron and typically be within the range forty micron to one hundred and seventy micron, or ten micron to one hundred and seventy micron.

Figure 2:
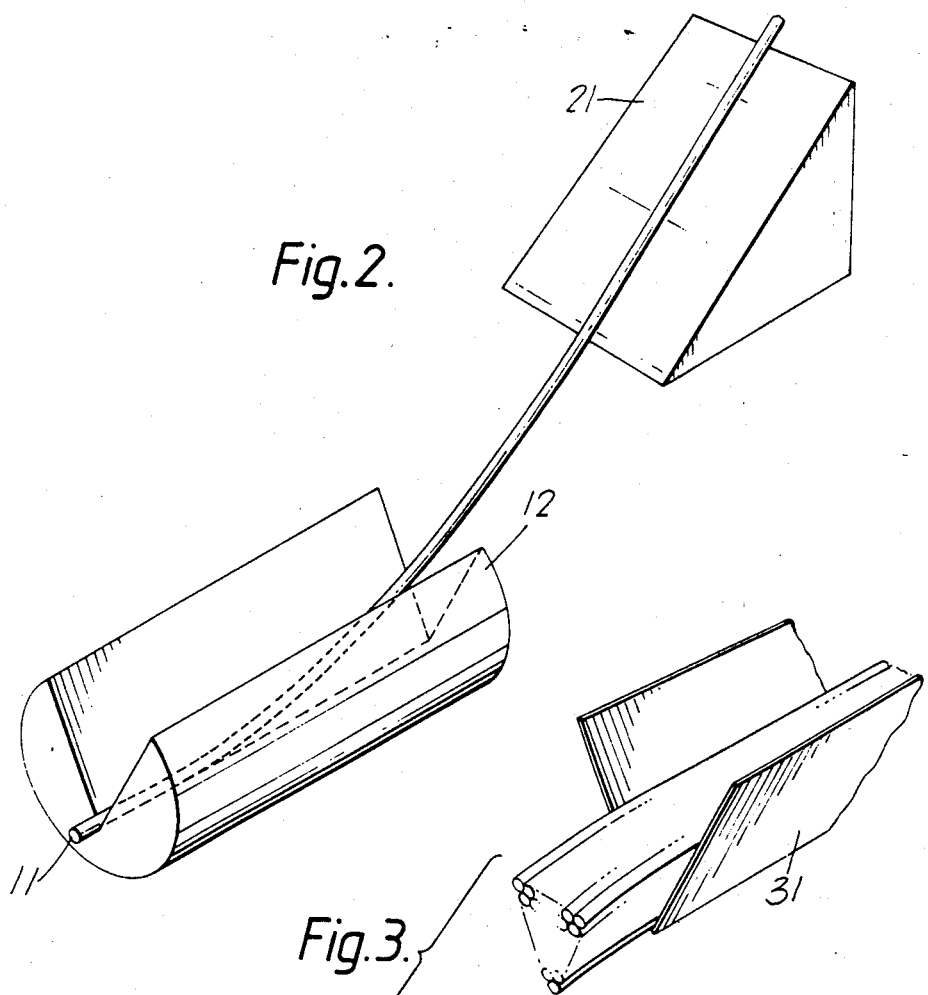
FIG. 2 is a view showing one method of forming such device.

One method of forming the device of FIG. 1 is illustrated in FIG. 2. The receptacle 12 is clamped with the "V" groove lying generally horizontal. An inclined surface 21 is supported at an angle of about twenty degrees to the horizontal a short distance from the rear end of the receptacle. The fibers for the array are chemically stripped of their protective coating to expose the fiber cladding. A first fiber is introduced to the "V" groove so that its front end portion lies in the groove and an intermediate part rests on surface 21. The fiber is thus bent and there will be a force on the front portion acting towards the base line of the groove. The fiber is then pushed forwards so that its front end extends past the front edge of the "V" groove, and this end is clamped so that the downward force on the fibers is increased and the fiber is held tight against the base of the groove. The hold on this fiber is maintained while two further fibers are brought down on top of it, by advancing them along the surface 21, until they also extend beyond the front end of the "V" groove. These fibers are then clamped so they press on the first fiber, which is released. The procedure is repeated, with the next row of three fibers being introduced to the "V" groove, clamped and the two fibers below released. Further rows of four, five, six and seven fibers are added. The top row of seven fibers is held clamped until wedge 20 has been fitted into the top of the groove and clamped.

A high viscosity expoxy adhesive, such as rapid Araldite (Trade Mark), is applied at the rear of the groove. A very low viscosity expoxy resin such as Perma Bond E27 (Trade Mark) is then introduced to the front of the "V" groove. A hot air gun is used to force the resin to flow along the groove between the fibers, and also cures the resin. Flow of resin past the rear end of the groove is prevented by the high viscosity adhesive.

The device thus formed can now be introduced to a standard connector, such as Amphenol SMA, ITT Canon or Weco connectors, and the central fiber 11' of the array aligned by standard procedures. After alignment the termination is cemented in the connector using a standard expoxy adhesive. The front surfaces of the fibers are machined so that they are normal to the axis of fiber 11, and then lapped and polished to give a transmission surface.

The device has rows of fibers lying with their axes accurately parallel to one another with each fiber contacting adjacent fibers, walls of the "V" groove or the wedge 20. The central axes of adjacent fibers are therefore equally spaced so that the device can be used satisfactorily for a variety of applications. These include linear and circular switches, wavelength multiplexors and demultiplexors using gratings (which may be switchable), integrated optical matrix switches, DCG holographic reflection filters, Fabry-Perot multipass cavity devices, and multifiber connectors.

Figure 3:
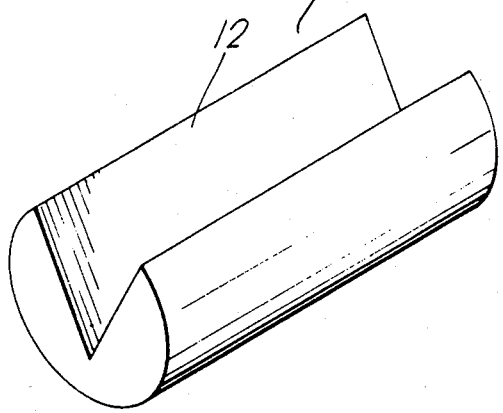
FIG. 3 is a view showing an alternative method of formation.

An alternative to the above method is now described with reference to FIG. 3. In the embodiment, a guide 31 in the form of a large "V" is provided. All of the fibers to be introduced into the "V" groove (twenty eight fibers) are placed in guide 31, where the outer coating of the fibers is chemically stripped. Guide 31 is then inclined and clamped so that it is a short distance from receptacle 12. The fibers are forced forwards so they enter the "V" groove of the receptacle. Forward movement continues until the ends if the fibers pass beyond the edge of the "V" groove. The fibers, properly juxtaposed, are clamped at the front and rear of the receptacle. Adhesive is applied as described for the first method and the device is aligned in a connector. It will be observed that in the second method, no wedge (20) is used.

The above methods may be used for forming devices having larger arrays than the one illustrated, for example fifty five fiber arrays with fibers having a diameter of fifty micron or one hundred and twenty five micron.

What we claim is:

1. An optical fiber terminating device comprising a two part receptacle in which at least one said two parts has two surfaces formed at an obtuse angle, said two parts being joined together such that said two surfaces of said at least one part meet at least one surface of the other part at a common base line to form a V-shaped groove having an open top opposite said base line, said obtuse angle causing said V-shaped groove to have a precise internal angle of sixty degrees, said V-shaped groove being arranged to receive a close packed array of small diameter juxtaposed fibers which are permanently fixed within the groove.

2. An optical fiber terminating device according to claim 1, in which each said two parts of said receptacle has two surfaces formed at an obtuse angle, said two parts being such that all of said surfaces meet at said common base line.

3. An optical fiber terminating device according to claim 1, including a wedge positioned in said open top of said V-shaped groove for contacting a row of fibers furthermost from said common line.

4. An optical fiber terminating device according to claim 3, in which said receptacle and said wedge are fabricated from silica.

5. An optical fiber terminating device according to claim 1, in which said fibers form an array having a triangular cross section, wherein the axis of a central fiber lies on the cross section of three lines bisecting the angles of the triangular array, and said receptacle is arranged to rotate about the axis of the central fiber.

6. An optical fiber terminating device according to claim 5, in which said receptacle is substantially cylindrical and the central fiber is positioned along the central axis of said cylindrical receptacle.

7. An optical fiber terminating device according to claim 1, in which said groove is arranged to receive fibers having an internal diameter within the range of forty micron to one hundred and seventy micron.

8. A method of terminating a plurality of optical fibers comprising the steps of joining two parts of a receptacle so that four surfaces meet along a common base line forming a precise sixty degree groove, bending small diameter fibers and introducing said fibers to said receptacle with a force acting generally towards the base line of said groove, and permanently securing an array of juxtaposed fibers in the receptacle.

9. A method of terminating a plurality of optical fibers according to claim 8, further comprising the steps of bending a first fiber and applying force in the direction of the base line of the groove so that said fiber lies along said groove, bending two further fibers and applying force in the direction of said groove so that the further fibers are juxtaposed with the first, and introducing further fibers in the same manner to form an optical fiber array having a triangular cross-section.

10. A method of terminating a plurality of optical fibers according to claim 8, further comprising the steps of grouping the fibers in a "V" shaped guide to form a triangular array, inclining said guide at an angle to said receptacle so as to bend said fibers and forcing the fibers in juxtaposition into said receptacle.

11. A method of terminating a plurality of optical fibers according to claim 8, 9, or 10 in which a wedge is positioned across the row of fibers furthermost from the base line.

12. An optical fiber terminating device comprising a receptacle formed of first and second parts, said first part including a pair of planar surfaces forming an obtuse exterior angle, one of said pair of planar surfaces being rigidly joined to a planar surface of said second part to form a V-shaped groove in said receptacle such that said obtuse exterior angle of said first part causes a precise acute internal angle to be established between the other of said pair of planar surfaces of said first part and an opposing planar surface of said second part, said other and opposing planar surfaces terminating at one of their respective ends along a base line of said V-shaped groove and angularly diverging therefrom towards their respective other ends so as to form between said other ends an open-end of said V-shaped groove, said groove adapted for receiving therein a close packed array of small diameter juxtaposed fibers.

13. An optical fiber terminating device as in claim 12 further comprising a wedge positioned in, and substantially bridging, said open end of said V-shaped groove.

14. A method of forming a tightly packed array of optical fibers comprising the steps of:
(1) placing one portion of said fibers in a V-shaped groove formed in a receptacle;
(2) bending another portion of said fibers in a direction such that said one portion thereof exerts a force generally towards the base of said V-shaped groove thereby tightly packing said array of fibers therein; and then
(3) permanently securing the thus formed array of said fibers in said V-shaped groove.

15. A method as in claim 14 wherein individual ones of said fibers are sequentially placed and bent according to steps (1) and (2) until said array is formed.

16. A method as in claim 14 wherein a preformed array of said fibers are collectively placed in said V-shaped groove and bent according to steps (1) and (2).

17. A method as in claim 14 wherein between steps (1) and (3) there is practiced the step of clamping said one portion in place in said V-shaped groove.

* * * * *